US010535851B2

(12) United States Patent
Yokoyama et al.

(10) Patent No.: US 10,535,851 B2
(45) Date of Patent: Jan. 14, 2020

(54) CYLINDRICAL LITHIUM-ION CELL

(71) Applicant: Panasonic Intellectual Property Management Co., Ltd., Osaka (JP)

(72) Inventors: Tomohiko Yokoyama, Osaka (JP); Yoshiyuki Muraoka, Osaka (JP); Takahiro Fukuoka, Tokushima (JP); Kyosuke Miyata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 27 days.

(21) Appl. No.: 16/013,229

(22) Filed: Jun. 20, 2018

(65) Prior Publication Data

US 2018/0301677 A1 Oct. 18, 2018

Related U.S. Application Data

(62) Division of application No. 15/268,093, filed on Sep. 16, 2016, now Pat. No. 10,026,938, which is a
(Continued)

(30) Foreign Application Priority Data

Dec. 28, 2011 (JP) .................................. 2011-288466

(51) Int. Cl.
*H01M 2/12* (2006.01)
*H01M 10/04* (2006.01)
(Continued)

(52) U.S. Cl.
CPC ............... *H01M 2/12* (2013.01); *H01M 2/08* (2013.01); *H01M 2/1241* (2013.01);
(Continued)

(58) Field of Classification Search
CPC ............................. H01M 2/12; H01M 2/1264
(Continued)

(56) References Cited

U.S. PATENT DOCUMENTS

2004/0023113 A1 2/2004 Suhara et al.
2009/0148753 A1 6/2009 Jeon
(Continued)

FOREIGN PATENT DOCUMENTS

JP 06-058549 U 8/1994
JP 11-040135 A 2/1999
(Continued)

OTHER PUBLICATIONS

U.S. Notice of Allowance dated Mar. 20, 2018 issued in U.S. Appl. No. 15/268,093.
(Continued)

*Primary Examiner* — Basia A Ridley
*Assistant Examiner* — James M Erwin
(74) *Attorney, Agent, or Firm* — McDermott Will & Emery LLP

(57) ABSTRACT

A cylindrical lithium ion battery in which an electrode group formed by winding a positive electrode and a negative electrode is housed in a battery case is disclosed. A sealing plate seals an opening of the battery case. An insulating plate having a plurality of openings is provided on a side of the electrode group closer to the sealing plate. The plurality of openings include a first hole with a largest opening area, and a plurality of second holes with opening areas smaller than the opening area of the first hole. An opening ratio of the first hole is 12% or more and 40% or less; a sum of opening ratios of the second holes is 0.3% or more and 10% or less; and a total opening ratio of all the openings is 20% or more and 50% or less.

14 Claims, 2 Drawing Sheets

Related U.S. Application Data division of application No. 14/369,140, filed as application No. PCT/JP2012/008463 on Dec. 28, 2012, now Pat. No. 9,472,795.

(51) Int. Cl.

| | | |
|---|---|---|
| H01M 2/08 | (2006.01) | |
| H01M 10/0525 | (2010.01) | |
| H01M 10/0587 | (2010.01) | |
| H01M 2/26 | (2006.01) | |
| H01M 4/525 | (2010.01) | |
| H01M 4/02 | (2006.01) | |

(52) U.S. Cl.
CPC ......... *H01M 2/1264* (2013.01); *H01M 2/263* (2013.01); *H01M 10/0422* (2013.01); *H01M 10/0431* (2013.01); *H01M 10/0525* (2013.01); *H01M 10/0587* (2013.01); *H01M 4/525* (2013.01); *H01M 2004/028* (2013.01); *Y02T 10/7011* (2013.01)

(58) Field of Classification Search
USPC .......................................................... 429/53
See application file for complete search history.

(56) References Cited

U.S. PATENT DOCUMENTS

| | | |
|---|---|---|
| 2011/0159357 A1 | 6/2011 | Guo et al. |
| 2012/0114979 A1 | 5/2012 | Kim et al. |

FOREIGN PATENT DOCUMENTS

| | | |
|---|---|---|
| JP | 2002-100343 A | 4/2002 |
| JP | 2004-111105 A | 4/2004 |

OTHER PUBLICATIONS

International Search Report issued in International Patent Application No. PCT/JP2012/008463 dated Apr. 2, 2013 (English translation).

Non-final Office Action dated Jan. 15, 2016 issued in U.S. Appl. No. 14/369,140.

Notice of Allowance dated Jun. 17, 2016 issued in U.S. Appl. No. 14/369,140.

CYLINDRICAL LITHIUM-ION CELL

RELATED APPLICATIONS

This application is a divisional patent application of U.S. patent application Ser. No. 15/268,093, filed on Sep. 16, 2016, which is a divisional patent application of U.S. patent application Ser. No. 14/369,140, filed on Jun. 26, 2014, now U.S. Pat. No. 9,472,795, issued on Oct. 18, 2016, which is a National Phase of International Patent Application No. PCT/JP2012/008463, filed on Dec. 28, 2012, which in turn claims the benefit of Japanese Patent Application No. 2011-288466, filed on Dec. 28, 2011, the disclosure of which applications are incorporated by reference herein.

TECHNICAL FIELD

The present disclosure relates to lithium ion batteries, and specifically relates to improvement of upper insulating plates of cylindrical batteries.

BACKGROUND ART

In general, cylindrical batteries are configured such that a power-generating element is accommodated in a bottomed metal battery case, with its opening sealed with a metal sealing plate. In secondary batteries, such as lithium ion secondary batteries, the power-generating element is comprised of an electrode group and an electrolyte. The electrode group is formed by spirally winding a positive electrode and a negative electrode, with a separator sandwiched therebetween. The separator insulates the positive electrode and the negative electrode from each other, and has a function of holding the electrolyte.

The sealing plate has a valve mechanism configured to ensure battery safety. In the event where an abnormal condition occurs in the battery, and the pressure in the battery case increases to a predetermined value, the valve mechanism is opened to release the gas in the battery case, thereby preventing an accident, such as a crack in the battery case.

Recently, however, with increasing functionality of electric devices, further increases in battery capacities are promoted, which as a result further increases a pressure in the battery case in the event where an abnormal condition occurs in the battery. In particular, the upper insulating plate on the edge of the electrode group may not be able to withstand the pressure and be deformed, and the electrode group may move upward and close an exhaust hole. To avoid this, various techniques for ensuring battery safety have been suggested.

For example, Patent Document 1 discloses a technique in which a diameter of the upper insulating plate is equal to or larger than an inside diameter of a groove formed in the battery case to reduce displacement of the electrode group.

CITATION LIST

Patent Document

Patent Document 1: Japanese Unexamined Patent Publication No. 2002-100343

SUMMARY OF THE INVENTION

Technical Problem

However, in conventional cylindrical batteries, sometimes there were cases in which when the pressure in the battery case abnormally increased, a central portion of the upper insulating plate was curved, and the electrode group moved upward, for example, and closed a valve hole that was formed when a rupture valve body in a sealing plate was ruptured. In such a case, the gas in the battery case might not be immediately released.

The present disclosure is thus intended to provide cylindrical batteries with improved safety, in which a valve hole in a valve plate included in a sealing plate is prevented from being closed by deformation of an insulating plate in the event where a pressure in a battery case is increased.

Solution to the Problem

To achieve the above objective, a cylindrical lithium ion battery according to the present disclosure is a cylindrical lithium ion battery in which an electrode group formed by winding a positive electrode and a negative electrode, with a separator interposed therebetween, is housed in a battery case, wherein a sealing plate having a gas exhaust valve seals an opening of the battery case, with a gasket interposed therebetween, an insulating plate having a plurality of openings is provided on a side of the electrode group closer to the sealing plate, the plurality of openings include a first hole with a largest opening area, and a plurality of second holes each with an opening area smaller than the opening area of the first hole, and in the insulating plate, an opening ratio of the first hole is 12% or more and 40% or less, a sum of opening ratios of the second holes is 0.3% or more and 10% or less, and a total opening ratio of all the openings is 20% or more and 50% or less.

The plurality of second holes may have the same opening areas, or may have opening areas different from each other. Further, the shapes of the first hole and the second holes are not specified.

The opening ratio of the first hole with a largest opening area is preferably 12% or more for ensuring penetration of the electrolyte into electrode group, and preferably 40% or less for ensuring insulating properties. Further, the sum of the opening ratios of the second holes each with an opening area smaller than the opening area of the first hole is preferably 0.3% or more for ensuring processability, and preferably 10% or less for ensuring insulating properties. Further, the total opening ratio of all the openings is preferably 20% for immediately exhausting gas generated from the electrode group in the event of an abnormal condition to the outside, and preferably 50% or less for reducing the displacement of the electrode group.

Advantages of the Invention

According to the present disclosure, gas generated from the electrode group can be immediately released in the event where the pressure in the battery case is increased, and deformation of the insulating plate can be prevented even in the case where the pressure in the battery case is increased. As a result, the electrode group does not move upward, and the valve hole is not closed. Thus, the battery safety can be improved according to the present disclosure.

DESCRIPTION OF EMBODIMENTS

First Embodiment

An embodiment of the present disclosure will be described in detail below with reference to the drawings.

Figure 1:
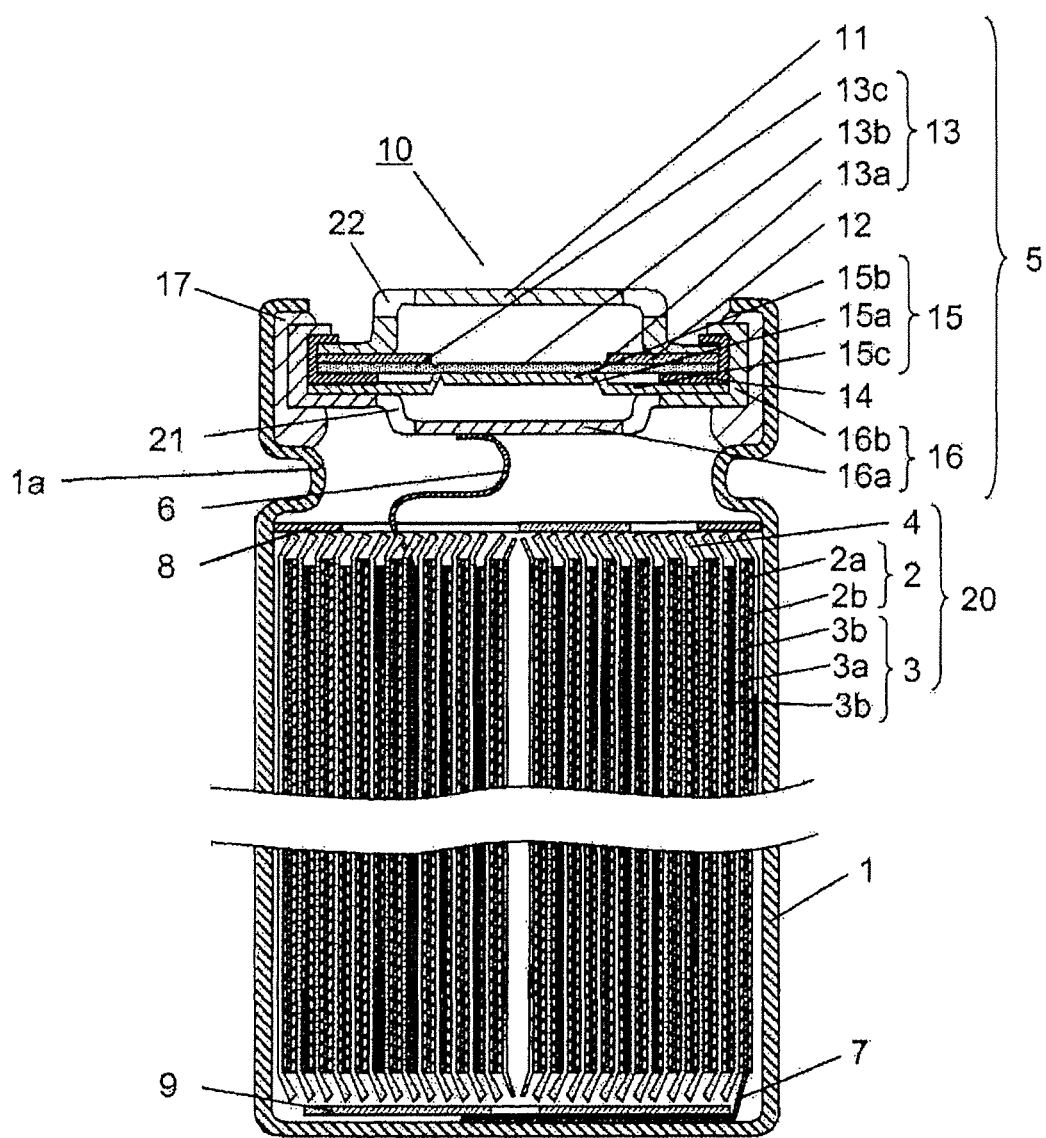
FIG. 1 is a cross-sectional view, showing a schematic configuration of a cylindrical battery according to an embodiment of the present disclosure.

FIG. 1 is a cross-sectional view, showing a schematic configuration of a cylindrical battery according to an embodiment of the present disclosure. The battery 10 shown in FIG. 1 is a cylindrical lithium ion secondary battery, and includes an electrode group 20 that is formed by spirally winding a positive electrode 2, a negative electrode 3, and a separator 4 interposed between the positive electrode 2 and the negative electrode 3. The electrode group 20 is accommodated in a bottomed cylindrical metal battery case 1 together with a nonaqueous electrolyte (not shown). An opening of the battery case 1 is sealed with a sealing plate 5. Thus, the electrode group 20 and the nonaqueous electrolyte are sealed inside the battery case 1.

The sealing plate 5 is comprised of a hat-like terminal plate 11, a positive temperature coefficient (PTC) thermistor plate 12 in an annular shape, a circular upper valve plate 13, a circular lower valve plate 15, and a substrate 16, which all are made of conductive materials, and an annular inner gasket 14 made of an insulating material. The inner gasket 14 is provided between a periphery of the upper valve plate 13 and a periphery of the lower valve plate 15 to avoid contact between the periphery of the upper valve plate 13 and the periphery of the lower valve plate 15. Further, the inner gasket 14 intervenes between a cylindrical portion 16b of the substrate 16, described later, and a circumference of the terminal plate 11 to avoid contact therebetween.

An outer gasket 17 made of an insulating material is provided between a circumference of the sealing plate 5 and the opening of the battery case 1. The outer gasket 17 seals between the sealing plate 5 and the battery case 1, and provides insulation between the sealing plate 5 and the battery case 1.

The terminal plate 11 and the PTC thermistor plate 12 are in contact with each other at their peripheries. The PTC thermistor plate 12 and the upper valve plate 13 are in contact with each other at their peripheries. The upper valve plate 13 and the lower valve plate 15 are welded to each other at their central portions. The lower valve plate 15 and the substrate 16 are in contact with each other at their peripheries. Accordingly, the terminal plate 11 and the substrate 16 are conductively connected with each other.

The substrate 16 of the sealing plate 5 is conductive with the positive electrode 2 via a positive electrode lead 6. Thus, the terminal plate 11 of the sealing plate 5 functions as an external terminal on the positive electrode side of the battery 10. On the other hand, the battery case 1 is conductive with the negative electrode 3 l via a negative electrode lead 7, and functions as an external terminal on the negative electrode side of the battery 10.

The substrate 16 includes a body 16a in a shallow round plate-like shape, and a cylindrical portion 16b which stands upright from the circumference of the body 16a. The lower valve plate 15 is placed on the periphery of the body 16a of the substrate 16. The inner gasket 14 is further placed on that periphery. The upper valve plate 13, the PTC thermistor plate 12, and the terminal plate 11 are sequentially placed on the inner gasket 14. An outer edge portion of the inner gasket 14 protrudes from an end of the cylindrical portion 16b of the substrate 16. In this state, the upper end of the cylindrical portion 16b of the substrate 16 is bent inward and crimped, and as a result, the terminal plate 11, the PTC thermistor plate 12, the upper valve plate 13, the inner gasket 14, and the lower valve plate 15 are held by the substrate 16. Here, the circumferences of the terminal plate 11, the PTC thermistor plate 12, and the upper valve plate 13 are separated from, and is not in contact with the cylindrical portion 16b of the substrate 16, due to the inner gasket 14.

The terminal plate 11 of the sealing plate 5 has a plurality of external gas vents 22. The substrate 16, too, has a plurality of internal gas vents 21.

The upper valve plate 13 has a circular inside portion 13b surrounded by an annular groove 13a, in a central portion. The inside portion 13b of the upper valve plate 13 is supported by an outside portion 13c surrounding the inside portion 13b. When the inside portion 13b is ruptured, a valve hole is formed there.

On the other hand, the lower valve plate 15 has a circular inside portion 15b surrounded by an annular groove 15a, in a central portion. The inside portion 15b of the lower valve plate 15 is supported by an outside portion 15c surrounding the inside portion 15b. When the inside portion 15b is ruptured, a valve hole is formed there.

The diameter of the inside portion 15b of the lower valve plate 15 is slightly smaller than the diameter of the inside portion 13b of the upper valve plate 13. The entire inside portion 15b of the lower valve plate 15 overlaps the inside portion 13b of the upper valve plate 13.

The inside diameter of the central hole of the annular PTC thermistor plate 12 is slightly larger than the diameter of the rupturable portion 13b of the upper valve plate 13. The entire rupturable portion 13b of the upper valve plate 13 overlaps a projection shape of the central hole of the PTC thermistor plate 12. The inside diameter of the central hole of the inner gasket 14 is larger than the inside diameter of the central hole of the PTC thermistor plate 12. The entire projection shape of the central hole of the PTC thermistor plate 12 overlaps the projection shape of the central hole of the inner gasket 14.

The substrate 16 has a plurality of internal gas vents 21, and is welded to the positive electrode lead at the body 16a. In the battery case 1, an upper insulating plate 8 and a lower insulating plate 9 are provided above and under the electrode group 20.

Figure 2:
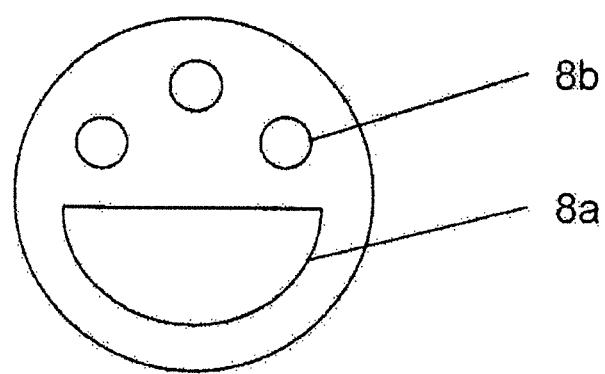
FIG. 2 is a schematic view of an upper insulating plate according to an embodiment of the present disclosure.

As shown in FIG. 2, the upper insulating plate 8 has a plurality of gas vents, i.e., a hole 8a having a largest opening area and the other holes 8b. The opening ratio of the hole 8a having the largest opening area is 12% or more and 40% or less, and a sum of the opening ratios of the other holes 8b is 0.3% or more and 10% or less. A total opening ratio is 20% or more and 50% or less.

In the above configurations, the rupturable portions 13b and 15b of the upper valve plate 13 and the lower valve plate 15 are broken and valve holes (not shown) are formed in the upper valve plate 13 and the lower valve plate 15, in the event where some accident occurred and the pressure in the battery case 1 abnormally increased. As a result, gas in the battery case 1 is released to the outside through the gas vents 8a and 8b of the upper insulating plate 13, the internal gas vents 21 of the substrate 16, the valve holes of the upper valve plate 13 and the lower valve plate 15, and the external gas vents 22 of the terminal plate 11.

Further, when an excessively large current flows through the PTC thermistor plate 12, the temperature of the PTC thermistor plate 12 increases, and the PTC thermistor plate 12 cuts off the current.

Sometimes there are cases in which the pressure in the battery case 1 abnormally increases. In such a situation, as well, it is possible to prevent the deformation of the upper insulating plate 8 caused by an increase of pressure in the battery case 1, and possible to prevent the valve holes of the upper valve plate 13 and the lower valve plate 15 from being completely closed by the electrode group 20 which has moved up, because the opening ratio of the hole 8a of the upper insulating plate 8, which has the largest opening area, is 12% or more and 40% or less, and the sum of the opening ratios of the other holes 8b is 0.3% or more and 10% or less, and the total opening ratio is 20% or more and 50% or less. As a result, it is possible to ensure a path for releasing gas from the battery case 1. The battery safety can therefore be improved.

The first embodiment of the present disclosure has been described with reference to FIG. 1 and FIG. 2, but the present disclosure is not limited to the first embodiment.

EXAMPLES

Next, examples of the present disclosure according to the first embodiment will be described.

First Example

Specimens comprised of lithium ion secondary batteries were fabricated in the following manner.

(Fabrication of Positive Electrode)

A lithium nickel-containing composite oxide ($LiNi_{0.85}Co_{0.1}Al_{0.05}$) with an average particle diameter of 10 μm was used as a positive electrode active material. A positive electrode mixture paste was prepared by mixing 8 percent by weight of polyvinylidene fluoride (PVDF) as a binder, 3 percent by weight of acetylene black as a conductive material, and an adequate amount of N-Methyl-2-Pyrrolidone (NMP), in 100 percent by weight of the positive electrode active material.

The positive electrode mixture paste was applied to both surfaces of a positive electrode current collector 2a made of aluminum foil, except an area where a positive electrode lead 6 was to be connected, and was dried to obtain a positive electrode mixture layer 2b. A precursor of a positive electrode was fabricated in this manner, and the precursor was rolled to obtain a positive electrode. At this moment, the precursor of the positive electrode was rolled such that the thickness of the positive electrode mixture layer 2b per surface of the positive electrode current collector 2a would be 70 μm.

The aluminum foil used as the positive electrode current collector 2a had a length of 600 mm, a width of 54 mm, and a thickness of 20 μm. Further, the area where the positive electrode lead 6 was to be connected was formed at a start end of the winding of the positive electrode, as described later.

Fabrication of Negative Electrode

Artificial graphite with an average particle diameter of 20 μm was used as a negative electrode active material. A negative electrode mixture paste was prepared by mixing 1 percent by weight of styrene-butadiene rubber as a binder, 1 percent by weight of carboxymethylcellulose as a thickener, and an adequate amount of water, in 100 percent by weight of the negative electrode active material.

The negative electrode mixture paste was applied to both surfaces of a negative electrode current collector 3a made of copper foil, except an area where a negative electrode lead 7 was to be connected, and was dried to obtain a negative electrode mixture layer 3b. A precursor of a negative electrode was fabricated in this manner, and the precursor was rolled to obtain a negative electrode. At this moment, the precursor of the negative electrode was rolled such that the thickness of the negative electrode mixture layer 3b per surface of the negative electrode current collector 3a would be 65 μm.

The copper foil used as the negative electrode current collector 3a had a length of 630 mm, a width of 56 mm, and a thickness of 10 μm. Further, the area where the negative electrode lead 7 was to be connected was formed at a finish end of the winding of the negative electrode. The negative electrode lead 7 was connected to the connection area by ultrasonic bonding.

Fabrication of Sealing Plate

The sealing plate 5 shown in FIG. 1 was fabricated. The upper valve plate 13 and the lower valve plate 15 were made of aluminum. The terminal plate 11 was made of iron. The substrate 16 was made of aluminum. The inner gasket 14 was made of polypropylene. Two internal gas vents 21 were formed in the bottom of the substrate 16.

Assembly of Battery

The positive electrode and the negative electrode fabricated in the above manner were layered, with a separator 4 interposed therebetween, and a layered structure was formed. A porous film made of polyethylene and having a thickness of 20 μm was used as the separator 4. In the obtained layered structure, a positive electrode lead 6 was connected to the start end of the winding of the positive electrode, and a negative electrode lead 7 is connected to the finish end of the winding of the negative electrode. In this state, the layered structure was spirally wound to form an electrode group 20.

The thus obtained electrode group 20 was housed in the battery case 1 made of iron. At this time, the positive electrode lead 6 was welded, by laser welding, to the substrate 16 of the sealing plate 5 to the circumference of which an outer gasket 17 made of polypropylene had been attached, and the negative electrode lead 7 was welded to the bottom of the battery case 1 by resistance welding. The battery case 1 having a diameter (outside diameter) of 18 mm, a height of 65 mm, and a wall thickness of 0.15 mm was used. The thickness of the battery case 1 is close to the thicknesses of the battery cases of commonly-marketed cylindrical lithium ion secondary batteries. An upper insulating plate 8 made of glass phenolic resin and a lower insulating plate 9 made of polypropylene were provided above and under the electrode group 20. The upper insulating plate 8 in which: the opening ratio of a hole 8a with a largest opening area was 30%; a sum of the opening ratios of the other holes 8b was 5%; and a total opening ratio was 35%, was used.

After that, a nonaqueous electrolyte was injected into the battery case 1. The nonaqueous electrolyte was prepared by dissolving lithium hexafluorophosphate ($LiPF_6$) at a concentration of 1.0 mol/L into a mixed solution of ethylene carbonate and ethyl methyl carbonate mixed in a one-to-one volume ratio.

Subsequently, the battery case 1 was provided with a projected portion la (see FIG. 1) projecting inward at a location 5 mm from the open end of the battery case 1 and circling around the battery case 1 in a circumferential direction to hold the electrode group 20 by the battery case 1.

Next, the sealing plate 5 was positioned in the opening of the battery case 1 by placing it on the projected portion 1a. Thereafter, the opening of the battery case 1 was bent inward and crimped to seal the battery case 1.

In this manner, ten specimens of cylindrical lithium ion secondary batteries each having a diameter of 18 mm and a height of 65 mm were fabricated. The capacity of the lithium ion secondary battery was designed to be 3400 mAh.

The ten specimens were subjected to the following test. First, the specimens were charged in an environment of a temperature of 25° C. at a current of 1500 mA until the battery voltage was 4.25 V. The charged specimens were placed on a hot plate and heated at a temperature of from 25° C. to 200° C. such that the temperature was increased by 1° C. per second, and the number of specimens having a crack in the battery case 1 was counted. The results are shown in Table 1 below.

Second Example

Ten specimens of lithium ion secondary batteries were fabricated in a similar manner as in the first example, except that a following upper insulating plate 8 was used in which: the opening ratio of the hole 8a with a largest opening area was 12%; a sum of the opening ratios of the other holes 8b was 9%; and a total opening ratio was 21%. The specimens were subjected to the same test conducted in the first example. The results are shown in Table 1 below.

Third Example

Ten specimens of lithium ion secondary batteries were fabricated in a similar manner as in the first example, except that a following upper insulating plate 8 was used in which: the opening ratio of the hole 8a with a largest opening area was 40%; a sum of the opening ratios of the other holes 8b was 5%; and a total opening ratio was 45%. The specimens were subjected to the same test conducted in the first example. The results are shown in Table 1 below.

Fourth Example

Ten specimens of lithium ion secondary batteries were fabricated in a similar manner as in the first example, except that a following upper insulating plate 8 was used in which: the opening ratio of the hole 8a with a largest opening area was 30%; a sum of the opening ratios of the other holes 8b was 0.3%; and a total opening ratio was 30.3%. The specimens were subjected to the same test conducted in the first example. The results are shown in Table 1 below.

Fifth Example

Ten specimens of lithium ion secondary batteries were fabricated in a similar manner as in the first example, except that a following upper insulating plate 8 was used in which: the opening ratio of the hole 8a with a largest opening area was 30%; a sum of the opening ratios of the other holes 8b was 10%; and a total opening ratio was 40%. The specimens were subjected to the same test conducted in the first example. The results are shown in Table 1 below.

Sixth Example

Ten specimens of lithium ion secondary batteries were fabricated in a similar manner as in the first example, except that a following upper insulating plate 8 was used in which: the opening ratio of the hole 8a with a largest opening area was 17%; a sum of the opening ratios of the other holes 8b was 3%; and a total opening ratio was 20%. The specimens were subjected to the same test conducted in the first example. The results are shown in Table 1 below.

Seventh Example

Ten specimens of lithium ion secondary batteries were fabricated in a similar manner as in the first example, except that a following upper insulating plate 8 was used in which: the opening ratio of the hole 8a with a largest opening area was 40%; a sum of the opening ratios of the other holes 8b was 10%; and a total opening ratio was 50%. The specimens were subjected to the same test conducted in the first example. The results are shown in Table 1 below.

Eighth Example

Ten specimens of lithium ion secondary batteries were fabricated in a similar manner as in the first example, except that a following upper insulating plate 8 was used in which: the opening ratio of the hole 8a with a largest opening area was 21%; a sum of the opening ratios of the other holes 8b was 9%; and a total opening ratio was 30%. The specimens were subjected to the same test conducted in the first example. The results are shown in Table 1 below.

Ninth Example

Ten specimens of lithium ion secondary batteries were fabricated in a similar manner as in the first example, except that a following upper insulating plate 8 was used in which: the opening ratio of the hole 8a with a largest opening area was 29%; a sum of the opening ratios of the other holes 8b was 1%; and a total opening ratio was 30%. The specimens were subjected to the same test conducted in the first example. The results are shown in Table 1 below.

Tenth Example

Ten specimens of lithium ion secondary batteries were fabricated in a similar manner as in the first example, except that a following upper insulating plate 8 was used in which: the opening ratio of the hole 8a with a largest opening area was 33%; a sum of the opening ratios of the other holes 8b was 9.5%; and a total opening ratio was 42.5%. The specimens were subjected to the same test conducted in the first example. The results are shown in Table 1 below.

First Comparative Example

Ten specimens of lithium ion secondary batteries were fabricated in a similar manner as in the first example, except that a following upper insulating plate 8 was used in which: the opening ratio of the hole 8a with a largest opening area was 15%; a sum of the opening ratios of the other holes 8b was 3%; and a total opening ratio was 18%. The specimens were subjected to the same test conducted in the first example. The results are shown in Table 1 below.

Second Comparative Example

Ten specimens of lithium ion secondary batteries were fabricated in a similar manner as in the first example, except that a following upper insulating plate 8 was used in which:

the opening ratio of the hole 8a with a largest opening area was 13%; a sum of the opening ratios of the other holes 8b was 2%; and a total opening ratio was 15%. The specimens were subjected to the same test conducted in the first example. The results are shown in Table 1 below.

Third Comparative Example

Ten specimens of lithium ion secondary batteries were fabricated in a similar manner as in the first example, except that a following upper insulating plate 8 was used in which: the opening ratio of the hole 8a with a largest opening area was 12%; a sum of the opening ratios of the other holes 8b was 0.3%; and a total opening ratio was 12.3%. The specimens were subjected to the same test conducted in the first example. The results are shown in Table 1 below.

TABLE 1

|  | OPENING RATIO OF HOLE 8a | SUM OF OPENING RATIOS OF HOLES 8b | TOTAL OPENING RATIO | NUMBER OF SPECIMENS WITH CRACKS |
|---|---|---|---|---|
| EXAMPLE 1 | 30 | 5 | 35 | 0 |
| EXAMPLE 2 | 12 | 9 | 21 | 0 |
| EXAMPLE 3 | 40 | 5 | 45 | 0 |
| EXAMPLE 4 | 30 | 0.3 | 30.3 | 0 |
| EXAMPLE 5 | 30 | 10 | 40 | 0 |
| EXAMPLE 6 | 17 | 3 | 20 | 0 |
| EXAMPLE 7 | 40 | 10 | 50 | 0 |
| EXAMPLE 8 | 21 | 9 | 30 | 0 |
| EXAMPLE 9 | 29 | 1 | 30 | 0 |
| EXAMPLE 10 | 33 | 9.5 | 42.5 | 0 |
| COMPARATIVE EXAMPLE 1 | 15 | 3 | 18 | 2 |
| COMPARATIVE EXAMPLE 2 | 13 | 2 | 15 | 4 |
| COMPARATIVE EXAMPLE 3 | 12 | 0.3 | 12.3 | 6 |

As shown in Table 1, cracks did not occur in the specimens of the first to tenth examples. This may be because the gas generated from the electrode group was immediately released since the total opening ratio is 20% or more in each of the first to tenth examples, and because the valve hole was not closed since the upper insulating plate was prevented from being deformed and upward movement of the electrode group was prevented. Here, the movement of the electrode group cannot be prevented when the total opening ratio exceeds 50%.

On the other hands, cracks occurred in some of the specimens of the first to third comparative examples. This may be because the total opening ratio is low in each of the first to third comparative examples, and therefore, the gas generated from the electrode group could not be immediately released when the pressure in the battery case was increased, and as a result, the upper insulating plate was deformed with an increase of the pressure in the battery case, causing and the electrode group to move upward and close the valve hole.

The opening ratio of the first hole 8a with a largest opening area is preferably 12% or more for ensuring penetration of the electrolyte into the electrode group, and preferably 40% or less for ensuring insulating properties. Further, the sum of the opening ratios of the second holes 8b each having an opening area smaller than the opening area of the first hole 8a is preferably 0.3% or more in view of processability, and preferably 10% or less for ensuring insulating properties.

In lithium ion batteries with an increased capacity, the pressure in the battery case increases more rapidly. Thus, the total opening ratio is preferably 30% or more. Further, total opening ratio is preferably 40% or less in view of reducing the displacement of the electrode group.

As described above, by using the upper insulating plate in which the opening ratio of the hole 8a with a largest opening area is 12% or more and 40% or less; the sum of the opening ratios of the other holes 8b is 0.3% or more and 10% or less; and the total opening ratio is 20% or more and 50% or less, it is possible to prevent an increase of the pressure in the battery case, while ensuring penetration of the electrolyte and insulating properties. The safety of the cylindrical battery is therefore improved.

INDUSTRIAL APPLICABILITY

The cylindrical lithium ion battery of the present disclosure is useful as a power source of portable electric devices such as personal computers, mobile phones and mobile devices, or as an auxiliary power source of electric motors of hybrid cars, electric cars, etc.

DESCRIPTION OF REFERENCE CHARACTERS 1 battery case
2 positive electrode
2a positive electrode current collector
2b positive electrode mixture layer
3 negative electrode
3a negative electrode current collector
3b negative electrode mixture layer
4 separator
5 sealing plate
6 positive electrode lead
7 negative electrode lead
8 upper insulating plate
9 lower insulating plate
10 battery
11 terminal plate
12 PTC thermistor plate
13 upper valve plate
14 inner gasket
15 lower valve plate
16 substrate
17 outer gasket
20 electrode group
21 internal gas vent
22 external gas vent

The invention claimed is:

1. A cylindrical lithium ion battery in which an electrode group formed by winding a positive electrode and a negative electrode, with a separator interposed therebetween, is housed in a battery case, wherein:
   a sealing plate having a gas exhaust valve seals an opening of the battery case, with a gasket interposed therebetween,
   an insulating plate having a plurality of openings is provided on a side of the electrode group closer to the sealing plate,
   the plurality of openings include a first hole with a largest opening area, and a plurality of second holes each with an opening area smaller than the opening area of the first hole, and
   the plurality of second holes have opening areas different from each other.

2. The cylindrical lithium ion battery of claim 1, wherein:
   a shape of the first hole and a shape of each of the second holes are different.

3. The cylindrical lithium ion battery of claim 1, wherein:
   a positive electrode lead is connected to the positive electrode, and the positive electrode lead is led from the first hole.

4. The cylindrical lithium ion battery of claim 1, wherein:
   an opening ratio of the first hole is 12% or more and 40% or less.

5. The cylindrical lithium ion battery of claim 1, wherein:
   a sum of opening ratios of the second holes is 0.3% or more and 10% or less.

6. A cylindrical lithium ion battery in which an electrode group formed by winding a positive electrode and a negative electrode, with a separator interposed therebetween, is housed in a battery case, wherein:
   a sealing plate having a gas exhaust valve seals an opening of the battery case, with a gasket interposed therebetween,
   an insulating plate having a plurality of openings is provided on a side of the electrode group closer to the sealing plate,
   the plurality of openings include a first hole with a largest opening area, and a plurality of second holes each with an opening area smaller than the opening area of the first hole, and
   a shape of the first hole and a shape of each of the second holes are different.

7. The cylindrical lithium ion battery of claim 6, wherein each of the plurality of second holes has a same opening area.

8. The cylindrical lithium ion battery of claim 6, wherein:
   a positive electrode lead is connected to the positive electrode, and the positive electrode lead is led from the first hole.

9. The cylindrical lithium ion battery of claim 6, wherein an opening ratio of the first hole is 12% or more and 40% or less.

10. The cylindrical lithium ion battery of claim 6, wherein a sum of opening ratios of the second holes is 0.3% or more and 10% or less.

11. A cylindrical lithium ion battery in which an electrode group formed by winding a positive electrode and a negative electrode, with a separator interposed therebetween, is housed in a battery case, wherein:
    a sealing plate having a gas exhaust valve seals an opening of the battery case, with a gasket interposed therebetween,
    an insulating plate having a plurality of openings is provided on a side of the electrode group closer to the sealing plate,
    the plurality of openings include a first hole with a largest opening area, and a plurality of second holes each with an opening area smaller than the opening area of the first hole, and
    an opening ratio of the first hole is 12% or more and 40% or less.

12. The cylindrical lithium ion battery of claim 11, wherein:
    a positive electrode lead is connected to the positive electrode, and the positive electrode lead is led from the first hole.

13. The cylindrical lithium ion battery of claim 11, wherein
    a sum of opening ratios of the second holes is 0.3% or more and 10% or less.

14. The cylindrical lithium ion battery of claim 11, wherein
    a total opening ratio of all the openings is 20% or more and 50% or less.

* * * * *